Figure 1:
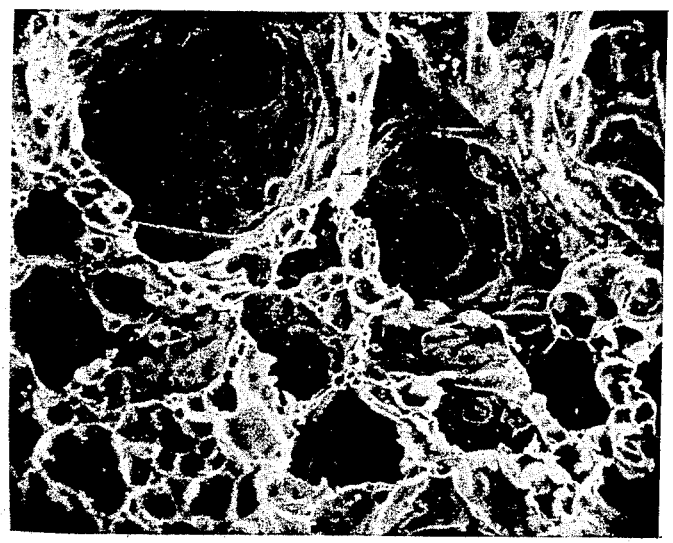

United States Patent [19]

Taupin et al.

[11] 4,234,330

[45] Nov. 18, 1980

[54] PROCESS OF MAKING CELLULATED GLASS BEADS

[75] Inventors: Pierre Taupin; Michel Glineur; Jean Florean, all of Maubeuge, France

[73] Assignee: BFG Glassgroup, Paris, France

[21] Appl. No.: 66,852

[22] Filed: Aug. 15, 1979

Related U.S. Application Data

[63] Continuation of Ser. No. 902,693, May 4, 1978, abandoned.

[30] Foreign Application Priority Data

May 19, 1977 [GB] United Kingdom ............... 21153/77

[51] Int. Cl.$^3$ ........................ C03B 19/10; C03B 19/08
[52] U.S. Cl. .......................................... 65/21; 65/22; 106/40 V
[58] Field of Search ..................... 65/21, 22; 106/40 V

[56] References Cited

U.S. PATENT DOCUMENTS

| 2,691,248 | 10/1954 | Ford | 65/22 X |
| 3,174,870 | 3/1965 | Connelly | 106/40 V |
| 3,325,341 | 6/1967 | Shannon | 65/22 X |
| 3,443,920 | 5/1969 | Overcashier et al. | 65/22 |

FOREIGN PATENT DOCUMENTS

| 1002786 | 8/1965 | United Kingdom . |
| 1055908 | 1/1967 | United Kingdom . |
| 1058474 | 2/1967 | United Kingdom . |
| 1197834 | 7/1970 | United Kingdom . |
| 1293692 | 10/1973 | United Kingdom . |

Primary Examiner—Robert L. Lindsay, Jr.
Attorney, Agent, or Firm—Cushman, Darby & Cushman

[57] ABSTRACT

A process of making cellulated glass beads by forming a mixture comprising glass particles and cellulating agent into nodules, heat treating the nodules to cause fusion of glass and evolution of gas from the cellulating agent to form cellulated glass beads, and cooling the cellulated glass beads to a rigid condition. The cellulating agent utilized has the characteristic of creating expansion forces due to the evolution of gas during heat treatment which are generated wholly or mainly while the glass viscosity is within the range $10^{6.5}$ to $10^{8.5}$ poises. The heat treatment is carried out with a quantity of cellulating agent at a maximum cellulation temperature which is not above the temperature corresponding with a glass viscosity of $10^{5.5}$ poises and for a time such that the beads immediately following the heat treatment are populated with cells, and after cooling have a bulk density of not more than 0.5 g/cm$^3$ and a water-permeability of less than 15% by volume determined by the immersion test herein specified.

27 Claims, 2 Drawing Figures

PROCESS OF MAKING CELLULATED GLASS BEADS

This is a continuation, of application Ser. No. 902,693 filed May 4, 1978 now abandoned.

This invention relates to a process of making expanded glass beads wherein a mixture comprising glass particles and a cellulating agent is formed into nodules and the mixture is heat treated in nodule form to cause evolution of gas from the cellulating agent and fusion of the glass particles, whereafter the resulting embryonic glass beads are cooled to a rigid condition.

Various processes are known for producing expanded glass beads. One such process starts from a comminuted gel composed of glass-formers and a cellulating agent. The individual portions of the comminuted gel are fed into a furnace in which the particles are heated to a high temperature. The materials used and the processing conditions are such that such portions become converted to glass microspheres. There is a need in industry for expanded glass beads of various physical properties for various purposes. For some of such purposes glass microspheres are not suitable. The need is for beads having different characteristics.

There is in particular an important demand for expanded glass beads which are of multi-cellular structure with a low bulk density and which at the same time have a low water-permeability.

A known method of making multi-cellular glass beads involves mixing pulverized glass with a gasifying material, for example, finely divided carbon, and firing the mixture to cause the glass to soften. The softened glass solidifies to a monolithic structure containing closed voids formed by expansion of the glass. For obtaining expanded glass granules or beads, this product must be crushed.

The foregoing process is not suitable for economically producing expanded glass beads of a predetermined size or size range. After crushing the expanded glass product, the granules have to be size-graded to extract a fraction of granules of an appropriate size range and the granular product, of whatever grain size, has unsatisfactory properties for various industrial uses. The granules are of irregular shape and widely varying strengths. Their water-permeability is not satisfactory.

A proposal has been made to form cellular glass beads by making pellets or nodules from a composition incorporating ground glass and carbonaceous material and firing the pellets under conditions which are controlled so that in a first stage carbon is removed from the surface layers of the pellets or nodules before sintering of the glass takes place. In a second stage the pellets or nodules are heated to higher temperature to burn carbon within the pellets and bring about cellation. The object of the heat treatment control is to form beads which have non-cellulated glass outer skins which make the glass beads substantially impervious to moisture. Therefore, the second stage of the heat treatment must not result in disruption of the continuity of the glass outer skin formed in the first stage. In practice this control is difficult to achieve. The resulting beads have a bulk density which is too high for certain industrial purposes.

Yet another proposal for making expanded glass beads involves mixing glass particles with an aqueous solution of an alkali metal silicate solution and an organic cellulating agent to form a paste which is then shaped into particles preparatory to being fired to convert it into expanded glass beads. Various additives have been proposed for altering the viscosity of the initial medium to make it more easily workable. As with all processes of the same kind, there is in this particular process a large number of different factors influencing the properties of the resulting beads. There is no teaching how to obtain beads which have a low bulk density and low water-permeability.

The object of the present invention is to provide a process whereby expanded glass beads of multicellular structure, low bulk density and low water-permeability can be easily prepared in a reproduceable manner on an industrial scale.

According to the present invention there is provided an improved process of making expanded glass beads wherein a mixture comprising glass particles and cellulating agent is formed into nodules and is subsequently heat treated to cause fusion of glass and evolution of gas from the cellulating agent to form cellulated glass beads which are then cooled to a rigid condition. The improvements comprise the steps of utilizing as the cellulating agent an agent having the characteristic of creating expansion forces due to the evolution of gas during the heat treatment which are generated wholly or mainly while the glass viscosity is within the range $10^{6.5}$ to $10^{8.5}$ poises and carrying out the heat treatment with a quantity of cellulating agent at a maximum cellulating temperature which is not above the temperature corresponding with a glass viscosity of $10^{5.5}$ poises, and for a time such that the beads immediately following the heat treatment are populated with cells and after cooling have a bulk density of not more than 0.5 g/cm$^3$ and a water-permeability of less than 15% by volume determined by the immersion test hereafter referred to.

This process enables multi-cellular beads of low bulk density and low water-permeability to be easily produced. This process involves a number of features which together contribute to this result. Summarized, these features relate to (a) the nature and quantity of cellulating agent, (b) the cellulating temperature of the heat treatment, and (c) the duration of the heat treatment.

With respect to feature (a), the nature of the cellulating agent is chosen so that the expansion forces are generated wholly or mainly while the glass viscosity is in the range $10^{6.5}$ to $10^{8.5}$ poises. The minimum amount of a given cellulating agent required for attaining the specified results can be easily ascertained by tests. There is generally gas generation substantially in excess of what can be trapped in the fused glass at the treatment temperature and in the time employed. Advantageously, the cellulating agent is selected so that the evolution of gas therefrom occurs wholly or mainly while the glass has a viscosity below $10^{7.65}$ poises. This factor contributes to the formation of beads of the required structure.

In preferred processes, the cellulating agent is selected so that the evolution of gas therefrom occurs wholly or mainly after most and preferably all or substantially all of the glass particles mixed therewith have reached sintering temperature. This condition favors a very uniform cell distribution. The sintering temperature depends on the composition of the glass. When using particles of ordinary soda lime glass, as is preferred, sintering is preferably performed at a temperature below 680° C. and most preferably in the range 600° to 650° C.

With respect to feature (b), the cellulating temperature or the temperature of the furnace wherein cellulation is carried out must not exceed that which corresponds with a glass viscosity of $10^{5.5}$ poises. This insures that the beads will not be overheated so that the expanded glass cannot become formed into beads of the required structure. The furnace can be at any temperature below the said maximum provided it is adequate for fusing the glass particles in the time available. Preferably the furnace temperature is within the range which corresponds to a glass viscosity of $10^{5.5}$ to $10^{7.5}$ poises. This furnace temperature range is sufficient, with quite short residence times in the furnace, for achieving the result that the expansion forces due to evolution of gas from the cellulating agent are generated wholly or mainly while the glass viscosity is within the range $10^{6.5}$ to $10^{8.5}$ poises. Generally, the furnace temperature will be lower the larger the size of the beads.

With respect to feature (c), that is, the duration of the heat treatment, if the beads remain in the furnace for too long a period the glass will be brought to a viscosity which is too low for forming beads of the required cellular structure containing entrapped gas. On the other hand, if the heating period in the furnace is too short, there will be insufficient cellulation and the cooled beads will have a bulk density in excess of the permitted maximum of 0.5 g/cm$^3$. An appropriate residence time of the beads within the furnace can easily be ascertained by tests.

Generally, the residence time will be shorter the smaller the size of the beads.

By way of example of furnace temperature and residence times for beads of different sizes, for beads below 3 mm in size the furnace temperature can be about 810° to 820° C. with a residence time of 2-3 minutes, and for beads of a size greater than 3 mm the temperature may be 780° to 800° C. with a residence time up to 7 to 10 minutes. The adoption of these conditions is favorable for reconciling a relatively high furnace temperature, which promotes rapid cellulation, with the need to keep the treatment period of the beads in the furnace sufficiently short to insure that the finished beads will have the requisite low water-permeability.

The process according to the invention permits attainment of a bulk density lower than 0.5 g/cm$^3$ for beads of a size below 3 mm and below 0.2 and even below 0.15 g/cm$^3$ for beads above the 3 mm size.

Beads produced by a process according to the invention have a low water-permeability. This is attributable to a kind of closed structure without necessarily having or making use of a surface skin of non-cellulated glass. It is to be understood, however, that it is not necessary for the surfaces of the beads to be free from pitting. A pitted surface configuration is, in fact, usually associated with beads of fully cellulated structure.

It is remarkable that the employment of excess cellulating agent is not incompatible with the object of producing beads having a low water-permeability. The two conditions are, in fact, compatible provided that the heating of the beads is restricted as above specified so that the viscosity of the glass remains high enough for the glass to form itself into the required structure notwithstanding the escape of gas. By appropriate selection of the furnace temperature and the residence time of the beads therein, the escape of gas from the beads can be kept low and at the same time cellulation of the glass even within the core of the individual beads can be insured. An important consideration to be taken into account is that generally the beads should not reach their equilibrium temperature during heat treatment for the temperature and residence time selected.

The cellulating agent is preferably initially in particle form in the nodules. Preferably the particles of cellulating agent are of approximately the same size range as the glass particles.

While the attainment of the required results is not dependent on the selection of a particular cellulating agent, preference is given to inorganic cellulating agents and in particular to inorganic metal salts.

Advantageously, the cellulating agent comprises a compound which decomposes to give rise to the evolution of gas. Cellulating agents in this category have been found to be the most satisfactory.

In particularly important processes according to the invention, calcium carbonate is used as cellulating agent. Such cellulating agent has been found to have particularly good properties for the purpose of the process. The calcium carbonate is preferably used in a quantity of from 1.7 to 2.7% (most preferably from 1.9 to 2.2%) by weight based on the weight of the glass.

When using an inorganic salt other than calcium carbonate the amount used, assessed in terms of gas evolution during the heat treatment, is preferably at least equivalent to 1.5% of calcium carbonate based on the weight of the glass. Generally, this causes the desirable excess gas evolution.

The invention includes processes wherein use is made of a cellulating agent which by the heat treatment enters into a reaction giving rise to the evolution of gas. Metal nitrides such as sodium nitride and potassium nitride are examples of cellulating agents which can be used but they are not so favored as calcium, not least on account of their cost. In another example, use is made of carbon as cellulating agent. In further examples use is made of a cellulating agent comprising a combination of carbon and a sulphate which on heating oxidizes the carbon to $CO_2$, or a combination of a metal carbide and a metal oxide which react in the appropriate temperature range with evolution of $CO_2$. A cellulating agent which can be used together with particles of a high melting glass comprises a combination of silicon carbide and tin oxide.

As already mentioned it is preferable to use ordinary soda-lime glass but the invention includes processes as hereinbefore defined wherein other types of glass are employed. It is convenient to form the initial glass particles by crushing waste glass. The crushing, or one or more stages thereof, can be carried out on a mixture of the glass with particles or pieces of cellulating agent. Although this will generally result in the final particles of cellulating agent being smaller than the glass particles, that is acceptable.

In certain processes according to the invention the glass particles have a specific surface of at least 3000 cm$^2$/g. This is another factor which assists the formation of beads of the required structure in a short period of time and with relatively low heat consumption.

Preferably the initial nodules contain glass particles and particulate cellulating agent, and water is used as the sole medium for causing such particulate ingredients to cohere in nodule form. Such a starting mixture can be very easily prepared at low cost. It has been found that if reliance is placed on water for achieving initial coherence of the particulate starting material in nodule form, this does not give rise to difficulties in the processing of the nodules. On the contrary, the absence of residual binder following the evaporation of water appears to be conducive to conversion of the nodules to a light-weight fully-cellulated structure. Moreover, the heat energy consumption for forming the beads appears to be lower.

The amount of water in the initial mixture should be carefully chosen so that the water can bind the particles in the mixture into sufficiently cohesive nodules. Advantageously, the mixture from which nodules are initially formed is of a consistency such that it tends to form nodules by natural segregation when fed onto a rotating pelletizing disc, and use is made of such natural segregation tendency to form the nodules.

Preferably the initial mixture contains 10 to 20% by weight of water based on the total weight of the mixture. For most mixtures the most suitable proportion of water is within this range.

As a guide to preparing an initial mixture with suitable properties, mixtures which have given good results have a consistency such that individual nodules of the mixture formed by natural segregation without molding pressure and approximately 2 mm in diameter showed after drying a breakage rate of approximately 50% when allowed to fall freely onto a hard firm surface from a height of 10 cm. It is by no means critical that the nodules should satisfy this test, but it is at least useful for assessing whether the initial mixture has an appropriate proportion of water and thus a suitable consistency.

In certain preferred processes according to the invention the beads are kept in rolling contact with each other during their treatment in the cellulating furnace. This rolling contact promotes the production of well formed beads and may reduce the degree of surface pitting of the beads. The rolling contact can easily be brought about by using a rotating furnace. The rolling motion prevents mutual adherence of the beads but, if desired, particles of material such as feldspar, which remains solid at the maximum temperature reached, can be mixed with the nodules.

In other advantageous processes, the beads are heated in loose condition in a hot gas stream in the cellulating furnace. This manner of supporting the beads in free relative movement during the cellulation also gives very good results. By way of example, the cellulating furnace can be a vertical furnace in which a hot gas stream rises continuously and carries the nodules upwardly within the furnace during their expansion and then through an exit opening at the top of the furnace from which the beads can be carried by the exhaust gases to a cellulating zone. In lieu of such a furnace a fluidized bed furnace can be used.

The heat treatment of the mixture comprising glass particles and cellulating agent, is preferably performed in two distinct stages. In the first of such stages nodules of such mixture, while free from rubbing contact with each other, are heated sufficiently to cause sintering of glass particles but insufficiently to cause expansion of such nodules. In the second stage, nodules of the mixture which has been heated in said first stage are heated in the cellulating furnace, while in free relative movement, to a higher temperature to allow cellulation to take place, the said furnace having a maximum temperature which does not exceed a temperature corresponding to a glass viscosity of $10^{5.5}$ poises. Preferably the temperature of the cellulating furnace is within the range corresponding to a glass viscosity range $10^{5.5}$ to $10^{7.5}$ poises as above referred to. The first stage heating is preferably performed in a furnace maintained at substantially constant temperature and so that the heating curve is substantially the same for all the nodules. For example, the nodules are transported on a conveyor, that is, an endless belt through a tunnel furnace at a temperature corresponding with a range of glass viscosity of $10^{7.65}$ to $10^{11}$ poises (and preferably $10^{8.5}$ to $10^{11.0}$ poises). Within that range a good sintering can be realized and sintering can usually occur with the nodules in light contact with each other.

The foregoing two-stage heat treatment is recommended because it enables the advantages attributable to rolling contact between embryonic beads during the period when they are at their highest temperature to be realized without subjecting initially formed nodules to possible disruptive forces during the period prior to sintering when they are relatively fragile.

In certain processes according to the invention the beads are annealed after leaving the cellulating furnace. The annealing involves a controlled cooling of the glass beads through the glass transformation range. Annealing avoids risk of fissuring of the beads due to harmful stress distributions. Annealing preferably takes place while the beads are transported through a tunnel furnace by a conveyor. The temperature gradient along the tunnel can be controlled in relation to the speed of movement of the beads therethrough so as to establish for the beads an appropriate cooling curve.

In some processes according to the invention the beads are cooled or allowed to cool quite rapidly following cellulation in the cellulation furnace. In other words, the beads are not annealed.

The decision whether or not annealing should be performed in any given case should take account of the sizes of the beads. If the beads are sufficiently small, cooling through the glass transformation range can be effected quite rapidly without the occurrence of injuriously steep temperature gradients within the beads. The omission of an annealing treatment can often be accepted in particular when forming expanded glass beads of a size of 3 mm or less.

The invention includes processes wherein the initial mixture comprising glass particles and cellulating agent are formed into nodules wholly or mainly in the size range 1.5 to 15 mm. Nodules of that size can be very easily formed.

Processes according to the invention can be employed for forming cellulated glass beads of various sizes. As already indicated the sizes of the cellulated beads largely depend on the sizes of the nodules at the commencement of the expansion state of the heat treatment.

For forming cellulated beads above about 3 mm in diameter, it is very suitable to form the initial mixture comprising glass particles and cellulating agent into nodules about half the required bead sizes and to use those nodules as the feedstock for feeding the furnace or furnaces in which the glass particles in the individual nodules are first sintered and then formed into expanded glass beads. The initially formed nodules can be dried if required before introducing them into the furnace or into the first furnace, if more than one is used.

The invention includes processes wherein, prior to the heat treatment and/or between sintering and cellulation stages of the heat treatment, the nodules are subjected to crushing. When introducing a crushing step the wet starting mixture of glass particles and cellulating agent can be formed into larger nodules than would otherwise be required. Any problems associated with the formation of the initial wet mixture into nodules of very small sizes are in that way avoided. This procedure is particularly advantageous for forming cellulated beads below 3 mm in size. In certain embodiment the nodules initially formed from the starting mixture are dried and then crushed to reduce the sizes of the nodules and the smaller nodules are used as feedstock in the heat treatment. In other embodiments the nodules initially formed from the starting mixture are subjected to a first stage of the heat treatment to cause sintering of glass particles in the individual nodules, these nodules are then crushed to form nodules of smaller sizes and these smaller nodules are subjected to the second stage of the heat treatment to bring about the expansion. By adopting either of those procedures it is easily possible to produce expanded glass beads of very small sizes, e.g. beads in the size range 0.5 to 3 mm. Of course the different procedures may be combined by introducing a drying and crushing step prior to a first stage heating treatment and a further crushing step between that treatment and the second stage of the heat treatment.

Each of the alternative procedures of crushing before sintering and crushing after sintering affords advantages over the other of them. Crushing before sintering is conducive to heat economy because heat losses between the sintering and expansion stages can be nil or at least very small. Crushing of the unsintered nodules requires less energy than crushing after sintering, and for a given energy consumption the throughput rate can be higher. In addition the sintering and expansion stages can then be carried out in one and the same furnace. Such combining of the two heating stages tends to be more viable if the nodules are of small sizes, e.g. 3 mm or less.

But by deferring crushing until after sintering important benefits accrue from the greater cohesiveness imparted to the nodules by the sintering operation, making them easier to handle and treat under mass processing conditions. A further important advantage of this procedure is that due to the larger sizes of the nodules prior to or during the sintering stage there is less tendency for these nodules to stick together during that part of the process. When adopting this alternative procedure, heat losses from the nodules after sintering need not be very large. It is not necessary for the sintered nodules to be cooled to ambient temperature before they are crushed. Crushing is preferably performed while the nodules are at elevated temperature, e.g. in the temperature range 250° to 300° C.

Advantageously crushing is performed after sintering and rapid cooling which induces fracturing or fissuring of the sintered nodules, which makes the crushing step easier. Due to the introduction of a crushing step, the sintered nodules subjected to the expansion treatment will often be of less regular, in particular less rounded, shape than would otherwise be the case. Taking this fact into account, it is recommended to heat the beads to a sufficienctly high temperature in the expansion furnace to encourage rounding of the beads by flow of molten glass.

When making small beads the use of a high expansion temperature is advantageous for promoting a lower bulk density product.

When a nodule crushing step is performed, it is preferable thereby to form a feedstock comprising nodules wholly or mainly below 1.5 mm in size, e.g., in the size range 0.25 to 1.5 mm. From such smaller nodules, expanded glass beads in the size range 0.5 to 3 mm can be formed by the heat treatment. Such beads may e.g. have a bulk density of from 0.28 to 0.47 kg/liter.

If it is desired in a given process to produce expanded glass beads which are exclusively in a given predetermined small range of sizes, e.g. a range within the size range 0.5 to 3 mm above referred to, the crushed product can be screened to remove nodules of unsuitable sizes and these can be recycled if appropriate.

Cellulated glass beads produced by processes according to the invention are useful for various industrial purposes, e.g. as a filler in molded bodies of synthetic resins and other materials, and in concrete. This applies to beads of both the smaller and larger size categories above referred to, i.e., above and below about 3 mm in size. The processes yield beads of rounded form, usually approximating to a spherical shape. This rounded form is of advantage when using the beads as filler in a concrete or other matrix because it makes it easier to achieve a good distribution of the beads throughout the matrix material.

The invention includes cellulated multi-cellular glass beads as such.

Multi-cellular glass beads according to the invention are characterized in that they are densely populated by cells and have a bulk density of less than 0.5 and preferably less than 0.2 g/cm$^3$, and even less than 0.15 g/cm$^3$ when the size of the beads is above 3 mm.

The foregoing bead characteristics and the preferred bead characteristics hereafter referred to are characteristics to be found in beads manufactured by a process within the broad scope of the invention as hereinbefore defined, or by such a process which has one or more of the preferred features which have been described.

Preferably cellulated glass beads according to the invention have a very low water-permeability such that they absorb less than 15% and preferably less than 10% by volume of water when immersed in water at room temperature for a period of 24 hours.

A particularly preferred product according to the invention comprises cellulated glass beads having a bulk density less than 0.5 g/cm$^3$ and a water permeability such that they absorb less than 15% and preferably less than 10% by volume of water when immersed in water at room temperature for 24 hours and/or absorb less than 0.25% when left for 24 hours in an atmosphere of 99% relative humidity.

In certain particularly advantageous beads according to the invention the beads are characterized by the presence of relatively large and small cells, the average volumes of the relatively large cells being many times the average volumes of the relatively small cells, the distribution of cells being such that the smaller cells are distributed through the entire volume of the portions of glass constituting the walls separating the larger cells.

With the above in mind, the present invention will be understood more in detail with respect to the accompanying drawings.

Figure 2:
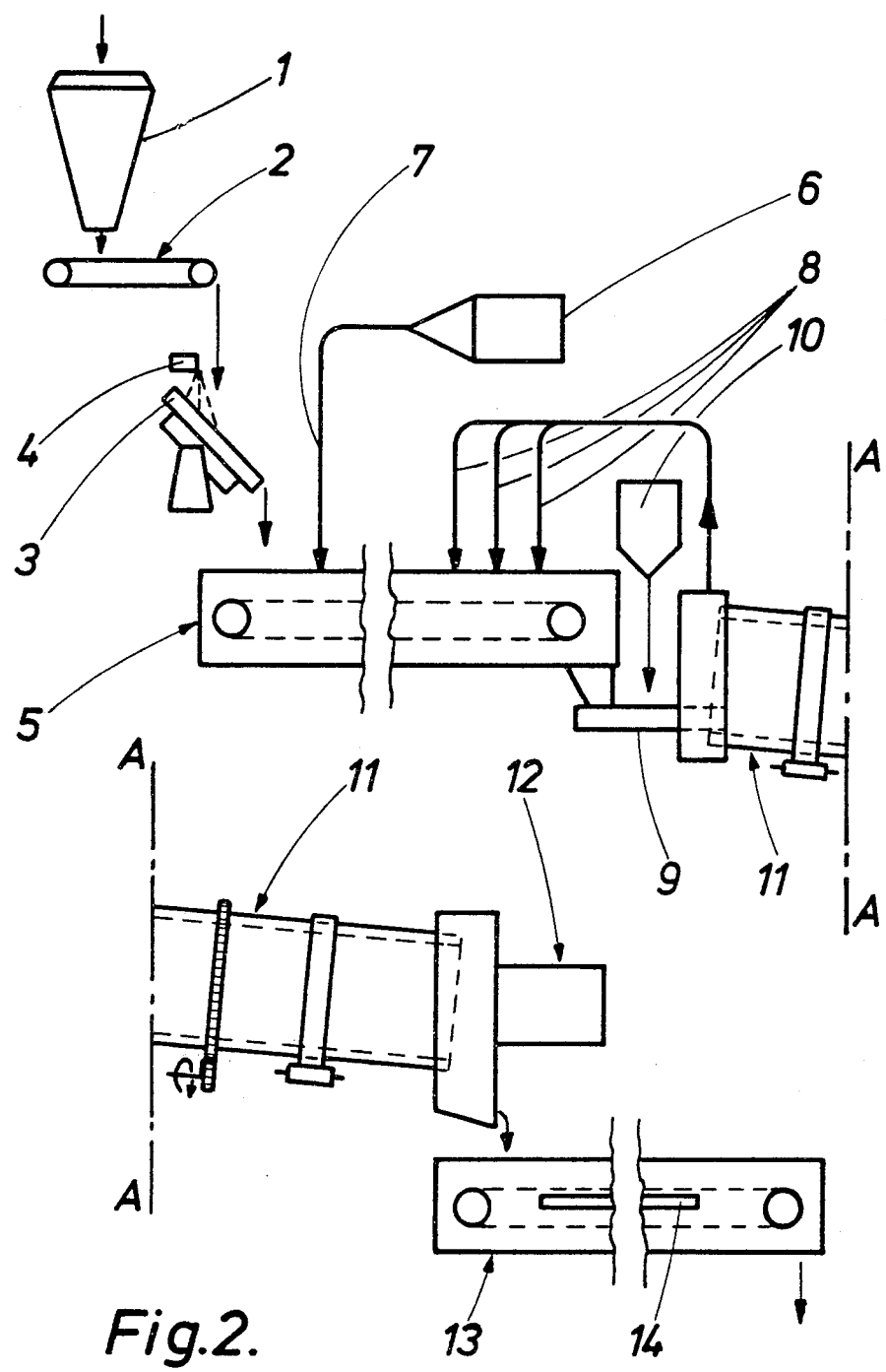

In the drawings:

FIG. 1 is a reproduction of a view taken by an electronic microscope of the interior structure of a cellulated glass bead embodying the principles of the present invention; and FIG. 2 is a diagrammatic view of a plant for carrying out the process of the present invention.

Referring now more particularly to FIG. 1 of the drawings, there is shown therein a representation achieved with the aid of an electron microscope, magnification ×100, of the interior structure of a cellulated glass bead according to the present invention, in the size range 8 to 16 mm. It will be seen that there is a distribution of large cells separated by wall portions which are themselves populated with micro-cells. The bead is representative of beads having the structural characteristics above specified. A batch of beads as represented in the drawing was tested and found to have a bulk density of less than 0.5 g/cm$^3$ and a water-permeability of less than 15% by volume determined by the specified immersion test.

The following are examples of a process according to the invention:

EXAMPLE 1

Crushed soda-lime glass with a mean grain size of 6 microns and a specific surface of 3500 cm$^2$/g was mixed with crushed limestone having a mean grain size of 4 microns in an amount of 2.1% based on the weight of the glass, plus water in a quantity of approximately 10% by weight based on the aggregate weight of the glass and limestone.

The mixture was thoroughly mixed and nodules of the mixture were formed by feeding it onto a rotating pelletizing disc. The nodules leaving the disc were gently distributed as a single nodule layer on a metal screen belt by which the nodules of approximately 5 to 10 mm in size were transported through a tunnel furnace maintained at a temperature of 600° to 650° C. corresponding to a glass viscosity between approximately $10^{10.5}$ and $10^9$ poises. The nodules remained in the furnace for about 13 minutes. During an initial period of about 10 minutes the nodules became dried and by that time the nodules had been brought to the furnace temperature. The nodules accordingly remained at that temperature for about 2 to 3 minutes. This was sufficient to cause the glass particles in superficial surface layers of the individual nodules to become sintered together. The quality of this surface sintering is important. It may have an important influence on the properties of the final product.

These surface-sintered nodules were fed into a rotary drum furnace maintained at a temperature of 800° C. (corresponding with a glass viscosity of approximately $10^{6.2}$ poises). The nodules remained in this furnace for between 3 and 4 minutes. During this period of time the continuous rotation of the drum kept the nodules in mutual rolling contact. The glass particles softened and the limestone decomposed with evolution of $CO_2$, causing cellulation. This evolution of gas started mainly while the glass had a viscosity below $10^{7.65}$ poises and continued while the viscosity of the glass was reduced to about $10^{6.5}$ poises. The nodules became converted to cellular glass beads in sizes approximately double the sizes of the initial nodules, the beads being characterized by a foamed glass structure with cells distributed through the whole volume of the beads. These beads were deposited on a metal belt conveyor by which they were transported through an annealing tunnel in which the beads were reduced to annealing temperature (about 500° C.) and were kept at that temperature for 10 to 15 minutes. The beads were subsequently rapidly cooled to ambient temperature. The formed beads had a bulk density of between 0.12 and 0.18 g/cm$^3$.

The beads had a very low water permeability as is evident from that fact that after immersion in water at room temperature for a period of 24 hours the beads were found to have absorbed less than 7% by volume of water. The water absorption after exposure of the beads for 24 hours in an atmosphere of 99% relative humidity at 20° C. was less than 0.25% by weight. The water absorption tends to be lower for beads having a bulk density at the upper end of the aforesaid bulk density range and can be as low as 3% by volume and less than 0.1% by weight respectively under the specified conditions.

The beads had a crushing strength in excess of 15 kg even for the beads having the lowest bulk density.

The beads accordingly had properties making them very suitable for use as an aggregate in making ceramic or other molded blocks, or for use as a thermally insulating material, e.g., in cavity walls.

Numerous modifications can be made to the conditions of the foregoing process while still producing beads with low water-permeability and low bulk density. A starting mixture with an amount of 2.25% of lime based on the weight of glass was used. The beads produced had properties similar to those given above. Beads with still better properties were made by a process as above described but using in the starting mixture soda-lime glass particles with a higher specific surface e.g. up to 7000 cm$^2$/g. Starting mixtures with up to 20% by weight of water have been used successfully.

In a further modification the nodules of the mixture, after having been formed by the pelletizing disc and dried were introduced into a furnace maintained at a temperature of 800° C. During the heating of the nodules in this furnace, first sintering of the glass particles and then evolution of gas causing cellulation and conversion of the nodules into glass beads occurred. This process employing a single heat treatment stage was not as easily controllable so as to obtain beads of the same quality as those obtained by the procedure above described wherein the heat treatment is performed in two distinct stages in different furnaces.

Referring now more particularly to FIG. 2 of the drawings, there is shown therein a plant which can be used in forming expanded beads by a process according to the invention as above described. The manner of carrying out the process in this plant is as follows.

The mixture of glass particles and cellulating agent is delivered from a hopper 1 onto a conveyor 2 which feeds the mixture onto an inclined rotating plate 3 which is continuously sprinkled with water from a sprinkler 4. The resulting pasty medium discharges off the plate in the form of nodules and these nodules are spread out along a screen belt support of a tunnel furnace 5. During their transportation through this furnace the nodules are heated by hot gases delivered from a generator 6 via delivery lines such as 7, and by hot gases recovered from later process stages delivered via delivery lines such as 8. In the furnace 5 the nodules are dried and the sintering stage of the heat treatment is performed. The temperature of the furnace 5 is between 600° and 650° C. to cause sintering of glass particles in superficial layers of the nodules.

The nodules discharging from the furnace 5 are received by a vibrating converyor 9 on which feldspar is distributed from a hopper 10. The feldspar serves to prevent the nodules from becoming stuck to the walls of the cellulating furnace in which the second stage of the heat treatment is carried out. The vibrating conveyor 9 feeds the nodules into a rotating furnace 11 of conventional type which is heated by hot gases from a generator 12. The temperature of the furnace 11 is about 800° C. Consequently the cellulating agent is activated and the viscosity of the glass of the glass particles in the individual nodules is lowered sufficiently to cause integration of the glass into a monolithic mass. In the result the nodules are converted into cellulated glass beads.

The expanded beads leaving the rotating furnace 11 are then passed through an annealing furnace 13 having a cooling system 14.

EXAMPLE 2

Crushed soda-lime glass with a mean grain size of 6 microns and a specific surface of 3500 cm$^2$ g was mixed with crushed limestone having a mean grain size of 4 microns in an amount of 2.1% based on the weight of the glass, plus water in a quantity of approximately 10% by weight based on the aggregate weight of the glass and limestone.

The mixture was thoroughly mixed to form a paste on a tray or disc from which nodules of the paste were discharged and gently distributed as a single nodule layer on a metal screen belt by which the nodules of approximately 8 to 10 mm in size were transported through a tunnel surface maintained at a temperature from 650° to 680° C. (corresponding with a glass viscosity between approximately $10^9$ and $10^{8.5}$ poises). The nodules remained in the furnace for about 15 minutes. During an initial period of about 10 minutes the nodules became dried and by that time the nodules had been brought to the furnace temperature. The nodules accordingly remained at that temperature for about 5 minutes. This was sufficient to cause the glass particles in superficial surface layers of the individual nodules to become sintered together. The quality of this surface sintering is often important because it has an important influence on the properties of the final product.

These surface-sintered nodules were then cooled rapidly to a temperature of about 250° to 300° C. to try to induce fissuring or fracturing of the nodules and they were immediately subjected to crushing between crushing rollers. The nodules from the crusher were screened to remove very small particles, mainly of glass, which were recirculated to the paste-forming station at the start of the production line. The residual crushed sintered nodules were in the size range 0.25 to 1.5 mm.

These very small sintered nodules were then fed into a rotary drum furnace maintained at a temperature of 810° to 820° C., corresponding to a glass viscosity of about $10^{6.1}$ to $10^6$ poises, and they remained in this furnace for 2 to 3 minutes. During this period of time the nodules were kept in continuous rolling contact by the rotation of the drum. The glass particles softened and the limestone decomposed with evolution of $CO_2$, causing cellulation, and the nodules became converted to cellular glass beads. The evolution of $CO_2$ started mainly while the glass viscosity was below $10^{7.65}$ poises and continued while the viscosity of the glass was reduced to about $10^{6.5}$ poises. The beads were characterized by a foamed glass core structure with cells distributed through the entire bead volume. The addition of feldspar or other anti-adhesion substance is useful for avoiding any tendency for the nodules to adhere to each other or to the drum walls.

The beads were reduced to annealing temperature (about 500° C.) and were kept at that temperature for 10 to 15 minutes. The beads were subsequently rapidly cooled to ambient temperature.

The formed beads were of sizes approximately double the sizes of the crushed sintered nodules, i.e., in the size range of 0.5 to 3 mm, and had a bulk density from 0.28 to 0.47 kg/liter according to their sizes. The beads had a very low water permeability corresponding with a water absorption of about 5 to 6% after 24 hours immersion in water at room temperature. The water absorption tends to be lower as the bulk density increases to the upper end of the aforesaid bulk density range.

A process according to the foregoing specific Example can be carried out in plant as described in connection with Example 1 with reference to FIG. 2 of the accompanying drawings, with addition of a suitable crusher for the sintered nodules.

In a modification of the foregoing process, the beads leaving the rotary furnace were cooled rapidly to ambient temperature without interruption of cooling at the annealing temperature. There was little evidence of any fracturing of the cooled beads.

In a further modification the nodules leaving the rotating disc were dried and the dried nodules were submitted to a crushing step in order to reduce their dimensions. The nodules within the size range 0.25 to 0.5 mm were retained and distributed on the metal screen belt for the sintering step and the process was continued as described above except that the crushing step between the sintering and cellulation stages were omitted. The final beads had a low water-permeability. Their bulk density was about 0.45 kg/liter.

By way of modification, the rotating furnace of the plant can be replaced by a vertical furnace in which the crushed sintered nodules are carried upwardly by a hot gas stream and thereby heated to bring about conversion of the nodules to expanded glass beads before they leave the furnace with the exhaust gases.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A process of making cellulated glass beads of fully cellulated structure by forming a mixture comprising glass particles and cellulating agent into nodules, heat treating the nodules to cause fusion of glass and evolution of gas from the cellulating agent to form cellulated glass beads, and cooling the cellulated glass beads to a rigid condition, the improvement which comprises the steps of utilizing as the cellulating agent an agent having the characteristic of creating expansion forces due to the evolution of gas during heat treatment which are generated wholly or mainly while the glass viscosity is within the range $10^{6.5}$ to $10^{8.5}$ poises, and carrying out the heat treatment with a quantity of cellulating agent at a maximum cellulation temperature which is not above the temperature corresponding with a glass viscosity of $10^{5.5}$ poises and for a time such that the beads immediately following the heat treatment are populated with cells throughout the volume thereof including the exterior surface thereof, and after cooling have a bulk density of not more than 0.5 g/cm$^3$ and a water-permeability of less than 15% by volume determined by the immersion test herein specified.

2. A process as defined in claim 1 wherein the cellulating agent is selected so that the evolution of gas therefrom occurs wholly or mainly while the glass has a viscosity below $10^{7.65}$ poises.

3. A process as defined in claim 1 or 2 wherein the cellulating agent is selected so that the evolution of gas therefrom occurs wholly or mainly after all or substantially all of the glass particles mixed therewith have reached sintering temperature.

4. A process as defined in claim 1 or 2 wherein the cellulating temperature of the heat treatment is within the range which corresponds to a glass viscosity of $10^{5.5}$ to $10^{7.5}$ poises.

5. A process as defined in claim 1 wherein the cellulating agent is initially in particle form in the nodules.

6. A process as defined in claim 5 wherein the mean size of the particles of cellulating agent is approximately the same as the mean size of the glass particles.

7. A process as defined in claim 1 or 5 wherein the cellulating agent comprises a compound which decomposes to give rise to evolution of gas.

8. A process as defined in claim 7 wherein calcium carbonate is used as the cellulating agent.

9. A process as defined in claim 8 wherein the quantity of calcium carbonate present is from 1.7 to 2.7% by weight based on the weight of the glass.

10. A process as defined in claim 5 wherein the initial nodules contain glass particles and particulate cellulating agent and water is used as the sold medium for causing such particulate ingredients to cohere in nodule form.

11. A process as defined in claim 10 wherein the initial mixture contains 10 to 20% by weight of water based on the total weight of the mixture.

12. A process as defined in claim 1 wherein the beads are kept in rolling contact with each other during their heat treatment.

13. A process as defined in claim 12 wherein the heat treatment is performed in a rotating furnace.

14. A process as defined in claim 1 wherein the beads are heated in loose condition in a hot gas stream.

15. A process as defined in claim 1 wherein the heat treatment of the mixture is performed in two stages in the first of which nodules of such mixture, while free from rubbing contact with each other, are heated sufficiently to cause sintering of glass particles but insufficiently to cause expansion of such nodules, and in the second of which stages nodules of the mixture which has been heated in said first stage are heated in a cellulating furnace, while in free relative movement, to a higher temperature to allow cellulation to take place, the cellulating furnace having a maximum temperature which does not exceed a temperature corresponding with a glass viscosity of $10^{5.5}$ poises.

16. A process as defined in claim 15 wherein the temperature of the cellulating furnace is within the range corresponding to a glass viscosity range of $10^{5.5}$ to $10^{7.5}$ poises.

17. A process as defined in claim 15 or 16 wherein the heating of nodules in said first stage is performed in a furnace maintained at substantially constant temperature and so that the heating curve is substantially the same for all the nodules.

18. A process as defined in claim 17 wherein said first stage heat treatment is performed by transporting said nodules on a conveyor through a tunnel furnace at a temperature in a range corresponding with a glass viscosity range of $10^{7.65}$ to $10^{11}$ poises.

19. A process as defined in claim 18 wherein the tunnel furnace is at a temperature in the range corresponding to a glass viscosity range of $10^{8.5}$ to $10^{11}$ poises.

20. A process as defined in claim 1 or 15 wherein the beads are annealed after leaving the cellulating furnace.

21. A process as defined in claim 20 wherein the beads are annealed during transportation thereof through a tunnel furnace by a conveyor.

22. A process as defined in claim 1 or 15 wherein the beads are cooled or allowed to cool rapidly following cellulation in the cellulation furnace.

23. A process as defined in claim 15 wherein prior to the heat treatment the nodules are subjected to crushing.

24. A process as defined in claim 15 wherein the nodules are crushed between sintering and cellulation stages of the heat treatment and while the nodules are in the temperature range 250° to 300° C.

25. A process as defined in claim 24 wherein following a sintering stage of the heat treatment the nodules are rapidly cooled to induce fracturing or fissuring thereof and they are then crushed before undergoing the cellulation stage of the heat treatment.

26. A process as defined in claim 1 or 15 wherein the nodules before undergoing the cellulation stage of the heat treatment are wholly or mainly in the size range 1.5 to 15 mm.

27. A process as defined in claim 1 or 15 wherein the glass particles in the initial mixture have a specific surface of at least 3000 cm$^2$/g.

* * * * *